US012783493B2

(12) United States Patent
Li

(10) Patent No.: US 12,783,493 B2
(45) Date of Patent: Nov. 3, 2026

(54) METADATA COMPRESSION FOR CLOUD APPLICATIONS

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/966,589

(22) Filed: Dec. 3, 2024

(65) Prior Publication Data

US 2026/0154248 A1 Jun. 4, 2026

(51) Int. Cl.
*G06F 16/22* (2019.01)

(52) U.S. Cl.
CPC ................................ *G06F 16/2282* (2019.01)

(58) Field of Classification Search
CPC .................................................. G06F 16/2282
See application file for complete search history.

(56) References Cited

U.S. PATENT DOCUMENTS 7,181,480 B1 * 2/2007 Nikiel .................... G06F 16/58 711/170
8,316,020 B1 * 11/2012 Kleinmann ............ G06Q 30/02 707/734
8,433,868 B2 * 4/2013 Nielsen ................. G06F 3/0647 711/162
11,093,462 B1 * 8/2021 Rabbani ................ G06F 16/215
11,429,677 B2 * 8/2022 Nagaraj ................ G06F 16/951
11,556,474 B1 * 1/2023 Bonanno ............. G06F 12/0897
2008/0168109 A1 * 7/2008 Gaurav ................. G06F 16/213 707/999.203
2010/0174974 A1 7/2010 Brisebois et al.
2013/0103651 A1 * 4/2013 Jha ...................... G06F 11/0748 707/747

(Continued)

FOREIGN PATENT DOCUMENTS

CN 115809026 A * 3/2023
EP 3441885 A1 * 2/2019 ......... G06F 12/0873

OTHER PUBLICATIONS

"U.S. Appl. No. 18/937,594, Non Final Office Action mailed Jul. 31, 2025", 26 pgs.

(Continued)

*Primary Examiner* — Apu M Mofiz
*Assistant Examiner* — Hubert Cheung
(74) *Attorney, Agent, or Firm* — SCHWEGMAN LUNDBERG & WOESSNER, P.A.

(57) ABSTRACT

Cloud systems store metadata for multiple tenants in cache memory. In uncompressed form, caching the metadata for an entity for multiple properties uses memory that is proportional to the number of tenants. As disclosed herein, global metadata is generated for one or more entities. The global metadata of an entity includes all properties of the entity from all tenants. For each entity, only one set of global metadata is stored. For each tenant, only the differential data for the entity is stored. As a result, the size of a tenant's differential metadata is substantially smaller than the tenant's original full metadata, saving cache resources of the cloud system. Full entity metadata for a tenant can be retrieved by making a copy of the global metadata for the entity and modifying the copy based on the tenant's differential data for the entity.

20 Claims, 15 Drawing Sheets

(56) References Cited

U.S. PATENT DOCUMENTS

| | | | | |
|---|---|---|---|---|
| 2013/0138681 | A1* | 5/2013 | Abrams | G06F 16/256 707/769 |
| 2014/0181154 | A1 | 6/2014 | Amulu et al. | |
| 2014/0214772 | A1* | 7/2014 | Kadayam | H04L 67/1095 707/655 |
| 2016/0246833 | A1 | 8/2016 | Eberlein et al. | |
| 2017/0109348 | A1* | 4/2017 | Nagaraj | G06F 16/211 |
| 2018/0060373 | A1* | 3/2018 | Foebel | G06F 16/275 |
| 2023/0053733 | A1* | 2/2023 | Collura | G06F 9/3806 |
| 2023/0117856 | A1* | 4/2023 | Vattem | G06F 16/27 707/705 |
| 2025/0227161 | A1* | 7/2025 | Li | H04L 67/561 |
| 2026/0127144 | A1 | 5/2026 | Li | |

OTHER PUBLICATIONS

"U.S. Appl. No. 18/937,594, Examiner Interview Summary mailed Oct. 21, 2025", 2 pgs.

"U.S. Appl. No. 18/937,594, Response filed Oct. 27, 2025 to Non Final Office Action mailed Jul. 31, 2025", 17 pgs.

"U.S. Appl. No. 18/937,594, Final Office Action mailed Nov. 21, 2025", 33 pgs.

"U.S. Appl. No. 18/937,594, Response filed Feb. 20, 2026 to Final Office Action mailed Nov. 21, 2025".

* cited by examiner

300

| 310 | ENTITYA METADATA TABLE | | | | |
|---|---|---|---|---|---|
| 320 | TENANT | PROPERTY | TYPE | REQUIRED | LABEL |
| 330A | 1 | PROP1 | STRING | TRUE | PROPERTY 1 |
| 330B | 1 | PROP2 | STRING | TRUE | PROPERTY 2 |
| 330C | 1 | PROP3 | LONG | TRUE | PROPERTY 3 |
| 330D | 2 | PROP1 | STRING | TRUE | PROPERTY 1 |

| 340 | GLOBAL ENTITYA METADATA TABLE | | | |
|---|---|---|---|---|
| 350 | PROPERTY | TYPE | REQUIRED | LABEL |
| 360A | PROP1 | STRING | TRUE | PROPERTY 1 |
| 360B | PROP2 | STRING | TRUE | PROPERTY 2 |
| 360C | PROP3 | DOUBLE | TRUE | PROPERTY 3 |

| 370 | ENTITYA METADATA DIFFERENCES TABLE | | | | |
|---|---|---|---|---|---|
| 380 | TENANT | PROPERTY | TYPE | REQUIRED | LABEL |
| 390A | 1 | PROP3 | LONG | TRUE | PROPERTY 3 |
| 390B | 2 | PROP2 | REMOVED | REMOVED | REMOVED |
| 390C | 2 | PROP3 | REMOVED | REMOVED | REMOVED |

*FIG. 3*

400

```
<Entity name="EntityA">
            <Property name="prop1" type="String" required="true" creatable="true"
updatable="true" visible="true" sortable="true" filterable="true" label="Property 1"
...(more attribute)...   />
           <Property name="prop2" type ="String" required="true" creatable="true"
updatable="true" visible="true" sortable=" true" filterable="true" label=" Property 2"
... />
           <Property name="prop3" type ="Long" required="true" creatable="true"
updatable="true" visible="true" sortable=" true " filterable=" true" label=" Property 3"
... />
           <Property name="prop4" type ="Double" required="true" creatable="true"
updatable="true" visible="true" sortable=" true " filterable=" true" label=" Property 4"
... />
           <Property name="prop5" type="Date" required="true" creatable="true"
updatable="true" visible="true" sortable=" true " filterable="true" label=" Property 5"
... />
          <Property name="prop6" type="DateTime" required=" true" creatable="true"
updatable="true" visible="true" sortable="false" filterable=" true" label=" Property 45"
... />
           <Property name="prop7" type="Byte" required="true" creatable="true"
updatable="true" visible="true" sortable="false" filterable="true" label=" Property 7"
.../>
           <Property name="prop8" type="Blob"   required="true" creatable="true"
updatable="true" visible="true"   sortable="false" filterable="true" label=" Property 8"
.../ >
          <Property name="prop9" type="String" required="false" creatable="true"
updatable="true" visible="false" sortable="false" filterable="false" label=" Property 9"
.../>
         <Property name="prop10" type="Int" required="false" creatable="true"
updatable="true" visible="true" sortable="false" filterable="false" label=" Property 10"
... />
         <Property name="prop11" type="Blob" required="false" creatable="true"
updatable="true" visible="true" sortable="false" filterable="false" label=" Property 11"
.../ >
</Entity>
```

*FIG. 4*

500

```
<Entity name="EntityA">
    <Property name="prop1" type="String" required="true" creatable="true"
updatable="true" visible="true" sortable="true" filterable="true" label="Property 1"
...(more attribute)...  />
    <Property name="prop2" type ="String" required="true" creatable="true"
updatable="true" visible="true" sortable=" true" filterable="true" label=" Property
2"  ... />
    <Property name="prop3" type ="Long" required="false" creatable="true"
updatable="true" visible="true" sortable=" true " filterable=" true" label=" Property
3"  ... />
    <Property name="prop4" type ="Double" required="true"
creatable="false" updatable="true" visible="true" sortable=" true " filterable="
true" label="My  Property 4"  ... />
    <Property name="prop5" type="Date" required="false" creatable="false"
updatable="true" visible="true" sortable=" true " filterable="true" label=" Property
5"  ... />
    <Property name="prop6" type="DateTime" required=" true"
creatable="true" updatable="true" visible="true" sortable="false" filterable=" true"
label=" Property 6"  ... />
    <Property name="prop7" type="Byte" required="true" creatable="true"
updatable="true" visible="true" sortable="false" filterable="false" label=" Property
7"  .../>
    <Property name="prop8" type="Float"   required="true" creatable="true"
updatable="true" visible="true"   sortable="false" filterable="true" label=" Property
8"  .../ >
    <Property name="prop9" type="Time" required="false" creatable="true"
updatable="true" visible="true" sortable="false" filterable="false" label=" Property
9"  .../>
    <Property name="prop12" type="Double" required="false"
creatable="true" updatable="true" visible="true" sortable="false" filterable="false"
label=" Property 79" ... />
    <Property name="prop13" type="Int" required="false" creatable="true"
updatable="true" visible="true" sortable="false" filterable="false" label=" Property
80"  .../ >
</Entity>
```

*FIG. 5*

600

```
<Entity name="EntityA">
    <Property name="prop1" type="String" required="true" creatable="true"
updatable="true" visible="true" sortable="true" filterable="true" label="Property 1"   ...(more
attribute)...  />
    <Property name="prop2" type ="String" required="true" creatable="true"
updatable="true" visible="true" sortable=" true" filterable="true" label=" Property 2"   ... />
    <Property name="prop3" type ="Long" required="true" creatable="true"
updatable="true" visible="true" sortable=" true " filterable=" true" label=" Property 3"  ... />
    <Property name="prop4" type ="Double" required="true" creatable="true"
updatable="true" visible="true" sortable=" true " filterable=" true" label=" Property 4"  ... />
    <Property name="prop5" type="Date" required="false" creatable="false"
updatable="true" visible="true" sortable=" true " filterable="true" label=" Property 5"   ... />
    <Property name="prop6" type="DateTime" required=" true" creatable="true"
updatable="true" visible="true" sortable="false" filterable=" true" label=" Property 6"  ... />
    <Property name="prop7" type="Byte" required="true" creatable="true"
updatable="true" visible="true" sortable="false" filterable="false" label=" Property 7"  .../>
    <Property name="prop8" type="Float"   required="true" creatable="true"
updatable="true" visible="true"   sortable="false" filterable="true" label=" Property 8"  .../ >
    <Property name="prop9" type="Time" required="false" creatable="true"
updatable="true" visible="true" sortable="false" filterable="false" label=" Property 9"  .../>
    <Property name="prop10" type="Int" required="false" creatable="true"
updatable="true" visible="true" sortable="false" filterable="false" label=" Property 10" ... />
    <Property name="prop11" type="Blob" required="false" creatable="true"
updatable="true" visible="true" sortable="false" filterable="false" label=" Property 11"  .../ >
    <Property name="prop12" type="Double" required="false" creatable="true"
updatable="true" visible="true" sortable="false" filterable="false" label=" Property 79" ... />
    <Property name="prop13" type="Int" required="false" creatable="true"
updatable="true" visible="true" sortable="false" filterable="false" label=" Property 80"  .../ >
</Entity>
```

*FIG. 6*

700

```
<Entity name="EntityA">
        <Property name="prop5" required="true" creatable="true" />
        <Property name="prop7" filterable="true" />
        <Property name="prop9" visible="false" />
        <removed value= "prop12, prop13" />
</Entity>
```

750

```
<Entity name="EntityA">
         <Property name="prop3" required="false" />
         <Property name ="prop4" creatable="false" label="My  Property 4"  ... />
        <removed value= "prop10, prop11" />
</Entity>
```

*FIG. 7*

METADATA COMPRESSION FOR CLOUD APPLICATIONS

TECHNICAL FIELD

The subject matter disclosed herein generally relates to systems for metadata compression for cloud applications and, more specifically, to metadata compression using differential storage.

BACKGROUND

Many cloud systems use microservices, which are composed of many independent small services. The small services often communicate with each other using representational state transfer (REST) application programming interfaces (APIs) and communication protocols such as hypertext transport protocol (HTTP), open data protocol (OData), or Google Remote Procedure Calls (gRPC). Each service has metadata that shows the service's API data structure.

Most cloud systems support multiple tenants, each of which may have its own unique data model. Thus, different tenants may represent the same entity in different ways. Cloud systems store metadata for tenants in cache memory. A cloud system may include dozens to hundreds of entities for each tenant. Each entity may include dozens to hundreds of properties. As a result, the metadata for each tenant may be measured in megabytes (MB) or gigabytes (GB).

BRIEF DESCRIPTION OF THE DRAWINGS

FIG. 3 shows an illustration of an example database schema, suitable for use in metadata compression for cloud applications.

FIG. 4 shows an example set of properties for an entity of a first tenant, suitable for metadata compression.

FIG. 5 shows an example set of properties for the entity of FIG. 4 of a second tenant, suitable for metadata compression.

FIG. 6 shows an example set of global properties resulting from metadata compression of FIGS. 4-5.

FIG. 7 shows example sets of differential metadata resulting from metadata compression of FIGS. 4-5.

DETAILED DESCRIPTION

Figure 1:
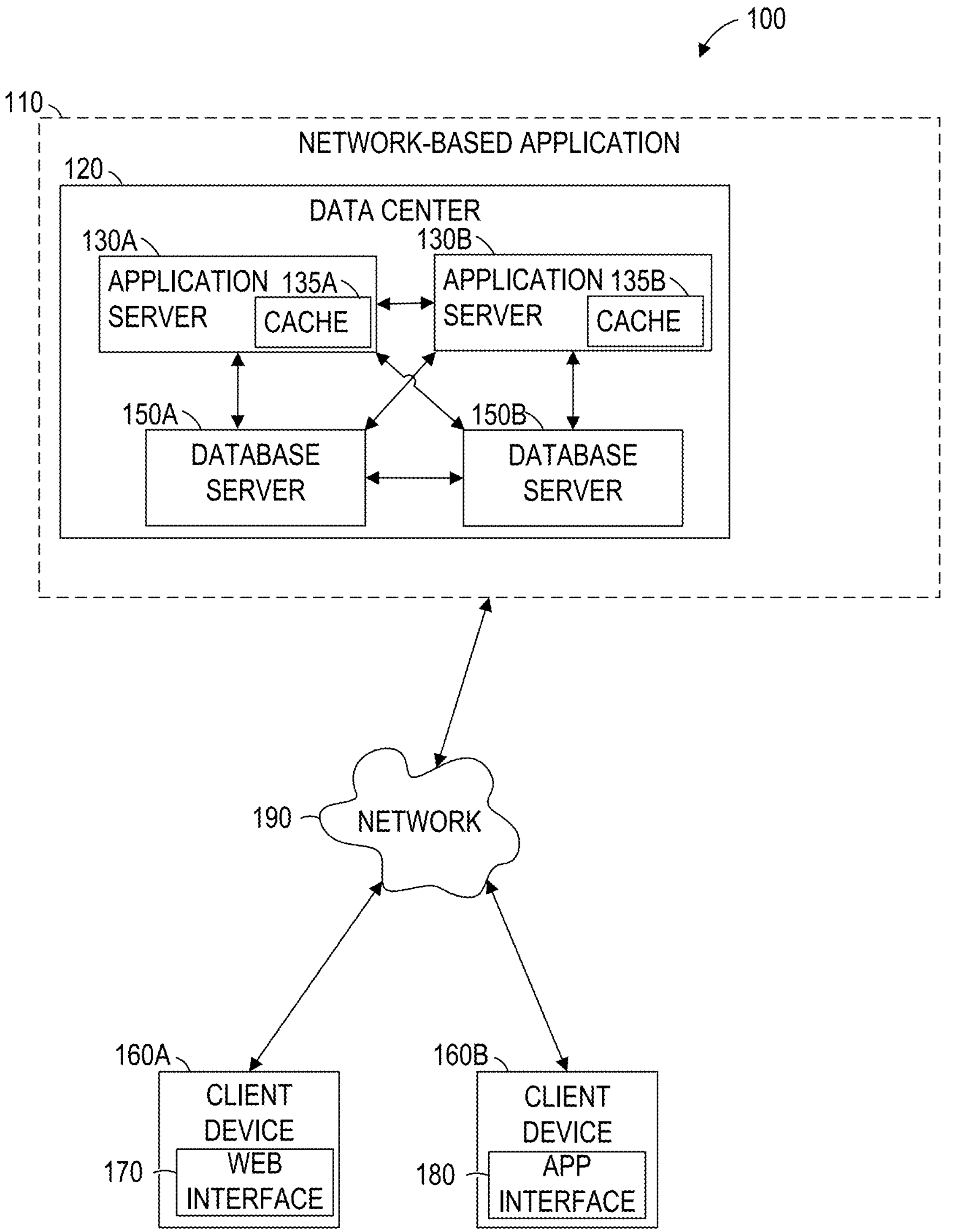
FIG. 1 shows a network diagram illustrating an example network environment suitable for implementing and using metadata compression for cloud applications.

Example methods and systems are directed to metadata compression for cloud applications. Cloud systems store metadata for multiple tenants in cache memory. The metadata for a tenant may include properties for entities. Different tenants may have different properties for the same entity. In uncompressed form, caching the metadata for an entity for multiple properties uses memory that is proportional to the number of tenants. As an example, an entity may be a data object (e.g., a user profile) with one or more properties (e.g., first name, last name, phone number, etc.). These data objects can be assembled to create more complex data objects (e.g., a purchase order may include simpler data objects such as a customer profile, with its own set of customer-related properties, coupled with a product profile, also with its own set of product-related properties. Most tenants use similar, if not sometimes identical, entities or data objects, but even where there is corresponding similarity between properties of an entity between two or more tenants, each tenant will have its own copy of its own metadata stored in cache. This can occur where a software provider offers standard data objects or entities, and all tenants use those entities as provided. In a case where three tenants have identical metadata for an entity, there will be three copies of the corresponding, identical metadata. However, in many cases, each tenant may require some customization of the offered entities to comply with its processes and existing software. In these cases, the customization of the entities will lead to different metadata. Taking the previous example, three different tenants may share a higher percentage of standard data objects or entities (e.g., 90%) and only require some modifications or customization of those data objects or entities (e.g., 10%). Storing three sets of substantially similar metadata for three different tenants is inefficient utilization of limited cache space.

Cache memory is a valuable resource for cloud systems. A cloud system may include dozens to hundreds of entities, each of which uses dozens to hundreds of properties. Accordingly, the metadata for a single tenant may be hundreds of MB in size. As the tenant count increases in traditional systems, the amount of metadata to support the tenants also increases in size, and thus the limits in cache size may be reached, causing high rates of cache evictions and subsequent loading of the latest tenant's metadata.

As disclosed herein, differential metadata storage reduces the total storage size for metadata of multiple tenants. Global metadata is generated for one or more entities. The global metadata of an entity includes all properties of the entity from all tenants. Each property may have one or more attributes that define the property. Examples of attributes include data types (e.g., integer, string, etc.) and an indication of whether that attribute is required to be used when using a particular property (e.g., TRUE or FALSE). For each property in the global metadata of the entity, the value of each attribute of the property is the most common value for the attribute of the property among all of the tenants. For each entity, only one set of global metadata is stored.

For each tenant, only the differential data for the entity is stored. If a property is in the global metadata but not in the tenant metadata, the property is marked as removed in the differential data. If all attributes of the property are the same in the tenant data as in the global metadata, no data for the property is included in the differential data. If some attributes of the property are different in the tenant data from the global metadata, only the differences are included in the differential data. As a result, the size of a tenant's differential metadata is substantially smaller than the tenant's original full metadata, thereby saving cache resources of the cloud system.

Full entity metadata for a tenant can be retrieved by making a copy of the global metadata for the entity and modifying the copy based on the tenant's differential data for the entity. Properties that are marked as removed in the tenant's differential data are deleted from the copy. Attributes of properties that are changed in the tenant's differential data are modified in the copy according to the tenant's differential data. Thus, a request for the tenant's metadata for an entity is easily responded to while the cache storage usage for the tenant's metadata is reduced.

FIG. 1 shows a network diagram illustrating an example network environment 100 suitable for implementing and using metadata compression for cloud applications. The network environment 100 includes a network-based application 110, client devices 160A and 160B, and a network 190. The network-based application 110 is implemented at a data center 120 comprising application servers 130A and 130B in communication with database servers 150A and 150B. An application executing on the application servers 130A-130B may access data from the database servers 150A-150B. The application servers 130A and 130B include cache memories 135A and 135B, respectively. The letter suffixes of reference numbers may be omitted when doing so does not raise ambiguity. For example, the application servers 130A-130B may be referred to collectively as "application servers 130." Similarly, when the specific one of the application servers 130A-130B is not of particular import, "application server 130" may be referenced.

The application running on the application server 130 may provide services to the client devices 160A and 160B. For example, a user of the client device 160A may be an employee of a business using a business application. The user may use the services to generate invoices, manage employees, develop other applications, or any suitable combination thereof. Use of the application may entail filtering data (e.g., to review certain invoices, employees, applications, or the like). The user interface (UI) for the application may be presented using a web interface 170 or an app interface 180.

The application 110 may be implemented using a collection of microservices. One or more of the application servers 130 may act as a registration server. Microservices register themselves with the registration server. Once a microservice is registered, it can be discovered by requests to the registration server. For example, a user of the client device 160A may request information about a microservice by providing the name of the microservice or a description of the microservice to the registration server. In response, the registration server provides information about one or more registered microservices. The user may use the provided information to configure the network-based application 110 to make use of one or more of the microservices.

Services may communicate using REST or OData APIs. Services may make use of entities, which are data objects comprising one or more named properties. The properties and their values (referred to as "entity metadata" or just "metadata") may vary between tenants for the same entity. A cloud system comprising the data center 120 may cache the properties and entities for multiple tenants (e.g., in the cache memories 135).

The cache memories 135 may be any type of cache, including a multi-level cache. A multi-level cache may include a first level memory and a second level memory. The first level memory of a multi-level cache may be smaller and faster than a second level memory of the multi-level cache. In some example embodiments, the cache memories 135 are a first level memory that cache data from other memory storage, such as a solid-state drive (SSD), that acts as a second level memory. By using the systems and methods discussed herein to compress the entity metadata, cache memory of the cloud system is conserved.

The application servers 130 may communicate with the database servers 150 using a REST API, OData, or another API. The application servers 130A-130B, the database servers 150A-150B, and the client devices 160A-160B may each be implemented in a computer system, in whole or in part, as described below with respect to FIG. 15. Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 15.

As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database, a disk-based database, a remote database, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The application servers 130A-130B, the database servers 150A-150B, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Though FIG. 1 shows only one or two of each element (e.g., one data center 120, two application servers 130A-130B, two client devices 160A and 160B, and the like), any number of each element is contemplated. For example, the application server 130A may be one of dozens or hundreds of active and standby servers and provide services to millions of client devices.

Figure 2:
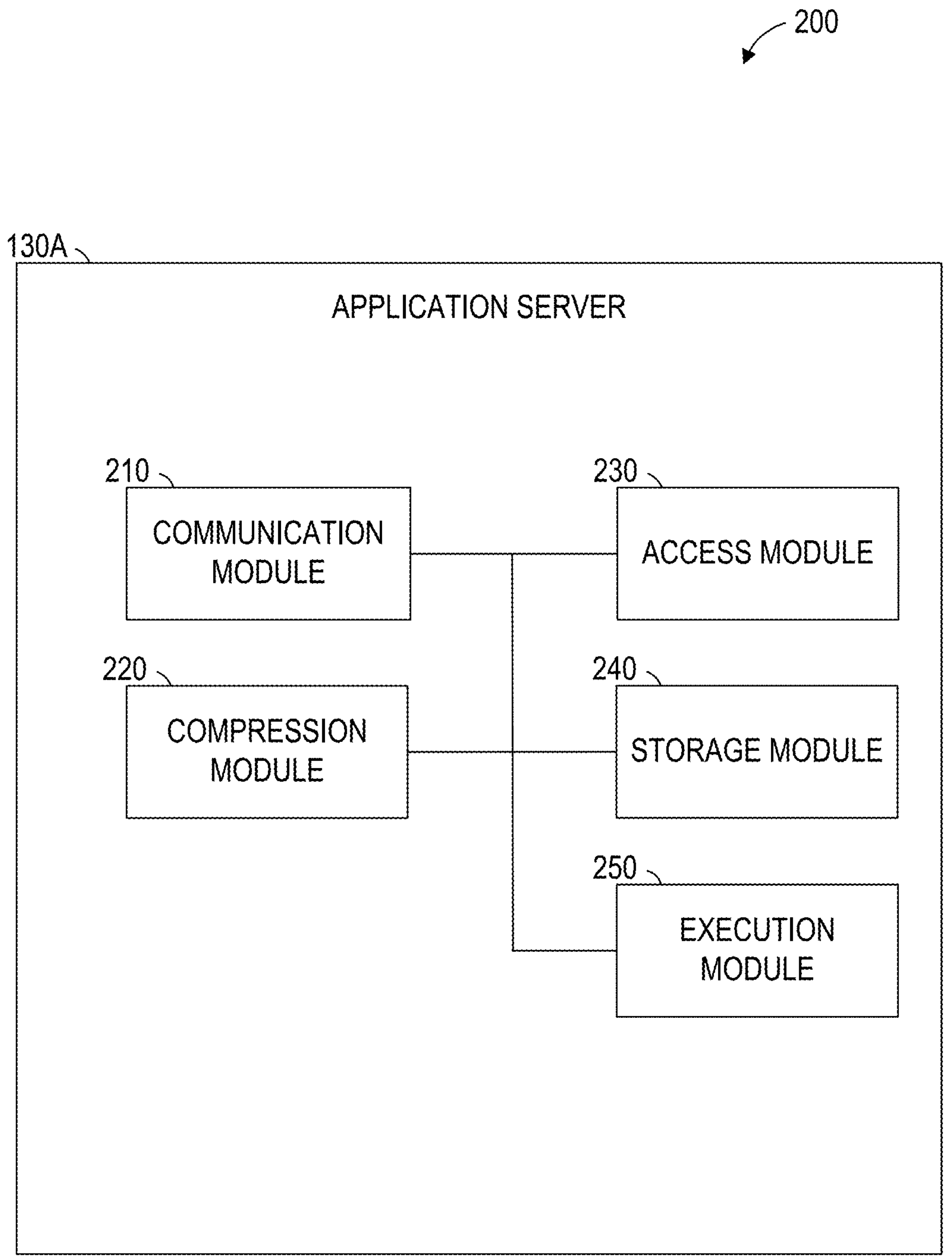
FIG. 2 shows a block diagram of an application server, suitable for implementing and using metadata compression for cloud applications.

FIG. 2 shows a block diagram 200 of the application server 130, suitable for implementing and using metadata compression for cloud applications. The application server 130A is shown as including a communication module 210, a compression module 220, an access module 230, a storage module 240, and an execution module 250 all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the application server 130A and transmits data from the application server 130A. The communication module 210 may receive a request for metadata and provide the request to the access module 230. The communication module 210 may access data from the database servers 150, such as metadata of multiple tenants. The accessed data may be provided to the compression module 220 for compression. Responsive metadata from the access module 230 is provided to the requesting device by the communication module 210.

The compression module 220 compresses metadata for multiple tenants. As described herein, differential storage may be used to compress the metadata. Global metadata is stored that includes default values for properties of entities. Only the differences between the properties of a particular tenant and the global metadata is stored for each tenant, thus reducing the total storage for the metadata of all tenants in combination.

Data, metadata, documents, instructions, or any suitable combination thereof may be stored and accessed by the storage module 240. The storage module 240 may provide a hierarchical memory structure. At the top of the hierarchical memory structure for the application server 130A is the cache memory 135A that provides quick access to data for the execution module 250. The storage module 240 may be implemented as local storage of the application server 130A, such as a hard drive. As another example, network storage may be accessed by the storage module 240 via the network 190.

The execution module 250 executions one or more instructions to provide an application. In some example embodiments, the execution module 250 receives a request from a client device 160 associated with a tenant and provides a response to the request. Requests are handled according to the tenant's corresponding metadata. For example, a first tenant may have different properties for an entity than a second tenant does. Accordingly, the execution module 250 will respond to requests for data for the entity differently based on which tenant has made the request.

FIG. 3 shows an illustration of an example database schema 300, suitable for use in metadata compression for cloud applications. The database schema 300 includes an EntityA metadata table 310, a global EntityA metadata table 340, and an EntityA metadata differences table 370. The EntityA metadata table 310 includes rows 330A, 330B, 330C, and 330D of a format 320. The global EntityA metadata table 340 includes rows 360A, 360B, and 360C of a format 350. The EntityA metadata differences table 370 includes rows 390A, 390B, and 390C of a format 380.

Each of the rows 330A-330D of the EntityA metadata table 310 shows a tenant, a property, a type, a label, and a required flag. The combination of rows with the same value for the tenant defines the set of properties for EntityA for the tenant. For simplicity, only a portion of the rows 330 of the EntityA metadata table 310 are shown and only a table for a single entity is shown. Data for other entities may be stored in other tables. It should be noted that EntityA metadata table 310 includes entries for all tenants and all properties for those tenants. As an example, if there were two tenants using EntityA, where tenant 1 defined 8 properties for EntityA and tenant 2 defined 7 properties for EntityA, EntityA metadata table 310 would have 15 rows 330. Some of those rows may have identical data between tenant 1 and tenant 2 and other rows may have different data between tenant 1 and tenant 2 for a particular property.

The global EntityA metadata table 340 includes the same fields as the EntityA metadata table 310 except for the absence of the tenant field. The global EntityA metadata table 340 stores the most common value for each attribute of each property from the EntityA metadata table 310. Thus, the values of the rows 360A and 360B match the values in the rows 330A and 330B. The row 360C shows that the most common type for the PROP3 property is double, not the type of long as shown in the row 330C. This difference suggests that there are additional rows 330 of the EntityA metadata table 310 in which other tenants are using the type of double for PROP3, such that the most common value for the type attribute is double. It should be noted that global EntityA metadata table 340 is created from EntityA metadata table 310 where each property listed in EntityA metadata table 310 is represented only once in one row 360 of global EntityA metadata table. From the previous example, if EntityA metadata table 310 has 15 rows 330 where tenants 1 and 2 share 6 common properties (e.g., PROP1), then global EntityA metadata table 340 would have 9 rows 360 (the 6 in common, 2 different properties from tenant 1 and 1 different property from tenant 2).

Each of the rows 390A-390C of the EntityA metadata differences table 370 stores attributes for a property for a tenant; thus the format 380 is the same as the format 320. To determine the values of attributes of a property for a tenant, data from the global EntityA metadata table 340 is modified with data from the EntityA metadata differences table 370. For example, tenant 1 does not have a row in the EntityA metadata differences table 370 for the property PROP1. Accordingly, the values for attributes for PROP1 for tenant 1 are taken from the row 360A of the global EntityA metadata table 340, without modification. The same is true for the property PROP2 for tenant 1 and the values for attributes for PROP2 for tenant 1 are taken from the row 360B, without modification.

However, the row 390A indicates that tenant 1 has different values for attributes of PROP3 from global EntityA metadata table 340. Accordingly, values from the row 390A are used in place of values from the row 360C when generating metadata for tenant 1.

Tenant 2 does not use the properties PROP2 and PROP3. Accordingly, the rows 390B and 390C indicate that those properties have been removed. When generating metadata for tenant 2, the rows 390B and 390C of the global EntityA metadata table 340 are ignored.

The EntityA metadata table 310, the global EntityA metadata table 340, the EntityA metadata differences table 370, or any suitable combination thereof, may include more or fewer fields than shown in FIG. 3. The database schema 300 may include additional tables to track additional types of data, such as users, businesses, products, and the like.

At regular intervals (e.g., daily or weekly) or in response to specific events (e.g., the registration of a new tenant which would trigger an update to EntityA metadata table 310), the global EntityA metadata table 340 and the EntityA metadata differences table 370 may be updated. Returning again to the previous example, where the combination of tenants 1 and 2 required 15 rows of metadata properties for each version of EntityA, the combination of rows in global EntityA metadata table 340 and EntityA metadata differences table 370 is reduced to 9 rows (6 rows representative of identical metadata stored in global EntityA metadata table 340 and 3 rows of differences stored in EntityA metadata differences table 370).

FIG. 4 shows an example set of properties 400 for an entity of a first tenant, suitable for metadata compression. The properties 400 are shown in extended markup language (XML) format. The <Entity> tag shows that the name of the entity to which the properties apply is EntityA. The properties for the EntityA are encapsulated between the <Entity> and </Entity> tags. Each <property> tag includes one or more attributes. The name attribute of each property indicates the name of the property to which the other attributes apply (e.g., types such as string). Some of the properties and attributes are underlined to aid in discussion. XML is a text format and does not itself include underlines.

The first three properties of the properties 400 correspond to the rows 330A-330C of FIG. 3. Thus, FIGS. 3 and 4 show two different ways of storing properties for entities for a first tenant.

FIG. 5 shows an example set of properties 500 for the entity of FIG. 4 of a second tenant, suitable for metadata compression. As in FIG. 4, the properties 500 are shown in an XML format, using <Entity> tags to bracket <property> tags for EntityA. Some of the properties and attributes are the same in FIGS. 4 and 5, and some differ. The underlined properties and attributes are those that differ.

The first property of the properties 500 corresponds to the row 330D of FIG. 3. Thus, FIGS. 3 and 5 show two different ways of storing properties for entities for a second tenant.

FIG. 6 shows an example set of global properties 600 resulting from metadata compression of FIGS. 4-5. As in FIGS. 4-5, the global properties 600 are shown in an XML format, using <Entity> tags to bracket <property> tags for EntityA. For each property and attribute that is the same in the properties 400 and the properties 500, the global properties 600 includes the shared value. Where the properties 400 and the properties 500 differ, the global properties 600 includes the values from one of the two. The selected values may be included in properties for a third tenant, selected randomly between the two tenants, or selected from one tenant based on tenant identifiers.

In this example, two tenants are used. Where more than two tenants are used, the values of properties and attributes selected for inclusion in the global properties 600 may be the most common values among values for all tenants.

FIG. 7 shows example sets of differential metadata 700 and 750 resulting from metadata compression of FIGS. 4-5. The differential metadata 700 are combined with the global properties 600 of FIG. 6 to generate the properties 400 of FIG. 4 for the first tenant. The differential metadata 750 are combined with the global properties 600 of FIG. 6 to generate the properties 500 of FIG. 5 for the second tenant.

The properties for EntityA that have the same values for the first tenant as in the global properties 600 are not included in the differential metadata 700. Thus, there are no <property> tags for properties prop1, prop2, prop3, prop4, prop6, prop8, prop10, and prop11. The global properties 600 includes two properties that the properties 400 lacks. Accordingly, the differential metadata 700 includes a <removed> tag that identifies the two properties prop12 and prop13.

For the property prop5, the properties 400 shows that the property has the attributes: type="Date" required="true" creatable="true" updatable="true" visible="true" sortable="true" filterable="true" label="Property 5". The attributes in the global properties 600 for the property prop5 are: type="Date" required="false" creatable="false" updatable="true" visible="true" sortable="true" filterable="true" label="Property 5". The differences are the values of the attributes required and creatable. Accordingly, the differential metadata 700 includes only the attributes required and creatable, and their values, for the property prop5. The amount of data stored for the properties prop7 and prop9 is even less than that stored for the property prop5, being only a single attribute for each of the latter two properties.

Similarly, the properties for EntityA that have the same values for the second tenant as in the global properties 600 are not included in the differential metadata 750. Thus, there are no <property> tags for properties prop1, prop2, prop5, prop6, prop7, prop8, prop9, prop11, and prop13. The global properties 600 includes two properties that the properties 500 lacks. Accordingly, the differential metadata 750 includes a <removed> tag that identifies the two properties prop10 and prop11. As with the differential metadata 700, the differential metadata 750 includes only the attributes for which the values are different in the properties 500 from the values in the global properties 600.

As can be seen by comparison of FIGS. 4-5 with FIGS. 6-7, the total data stored for the two tenants is lowered using the differential compression method rather than storing the uncompressed property values for each tenant.

Figure 8:
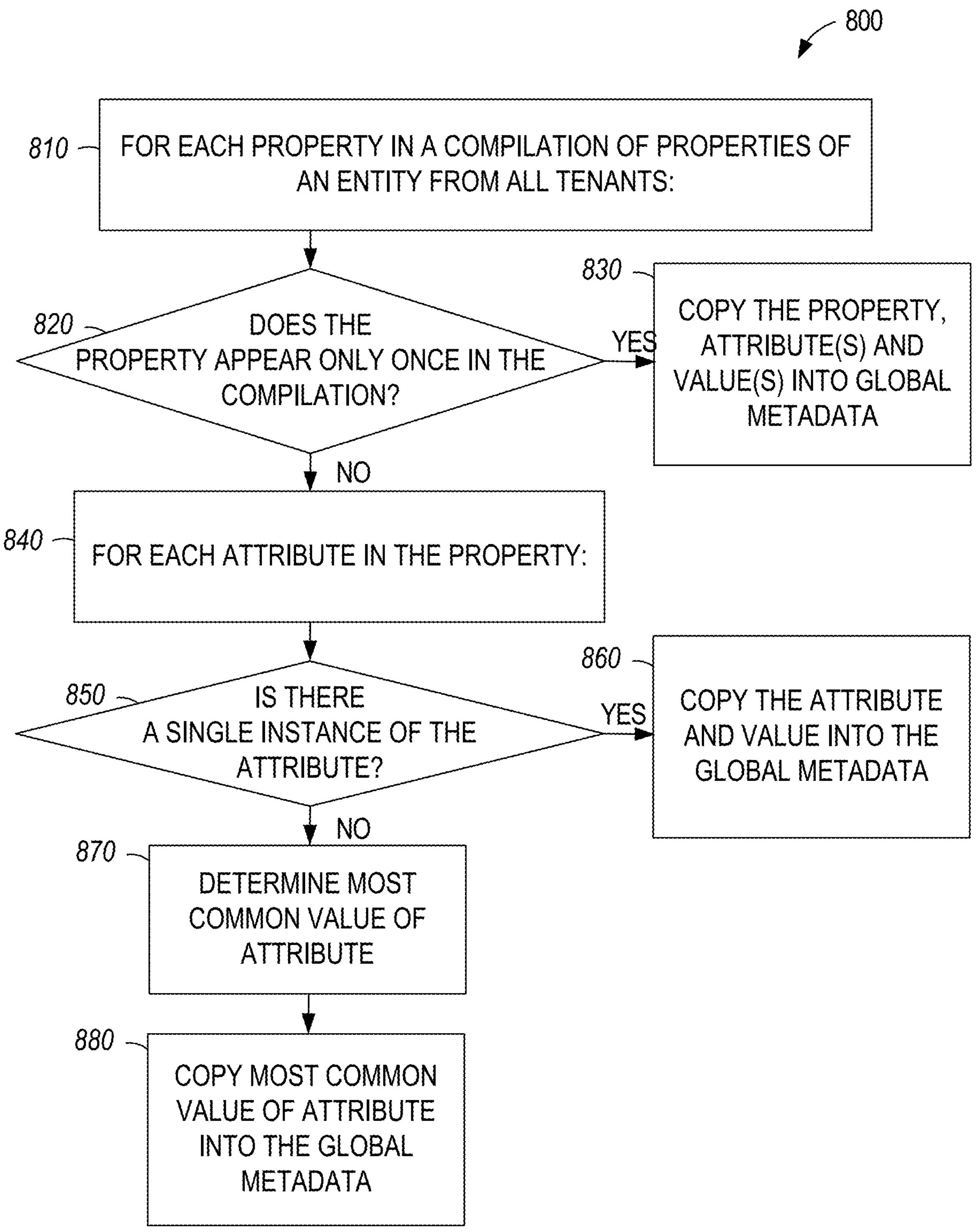
FIG. 8 shows a flowchart illustrating a method of generating global properties for metadata compression for cloud applications.

FIG. 8 shows a flowchart illustrating a method 800 of generating global properties for metadata compression for cloud applications. The method 800 includes operations 810-880. By way of example and not limitation, the method 800 is described as being performed by the application server 130A of FIG. 1, using the modules of FIG. 2 and the database schema of FIG. 3 or the metadata files of FIGS. 4-6.

In operation 810, the compression module 220 creates a compilation of all properties from all of the tenants for each of the entities. In one example, this can be a concatenation of all properties from all tenants using EntityA resulting in a table like EntityA metadata table 310 from FIG. 3. For simplicity, and as shown in FIG. 3, only properties of a single entity are shown and only two tenants are shown. In practice, dozens or hundreds of entities may be present, and properties may be stored for dozens or hundreds of tenants.

In operation 820, the compression module 220 determines if a property appears only once in the compiled data. Referring again to EntityA metadata table 310 in FIG. 3, tenant 1 is shown with three properties for EntityA and tenant 2 is shown with one property for EntityA. The one property for tenant two is common to, and may be identical in attributes to, one of the three properties for tenant one. However, two other properties only exist for tenant one and not for tenant two. As such there is one instance of prop2 and prop3 in EntityA metadata table 310 of FIG. 3 determined at operation 820. At operation 830, those properties, associated attributes and associated values for each attribute are copied into a global table such as global EntityA metadata table 340 of FIG. 3 from EntityA metadata table 310. That is, rows 330B and 330C of EntityA metadata table are copied into global EntityA metadata table 340 at rows 360B and 360C.

If in operation 820 multiple instances of the same property appear in the compilation of properties, the process continues at operations 840. Operation 840 causes operations 850-880 to be performed for each attribute in the duplicated property. Referring again to FIG. 3, there are two instances of prop1; one for tenant one and one for tenant two. In this example, prop1 would be operated upon at operations 840, 850, 860 and 870 (as needed).

In operation 850, it is determined if any single instance of the set of multiple properties has a unique attribute. While not shown in FIG. 3, in a different example, tenant 1 could have one integer attribute in its version of prop1 while tenant 2 does not. If such an attribute is determined at operation 850, the process continues at operation 860 where that unique attribute and associated value is copied into global metadata. If in operation 850 multiple instances of the same attribute are determined, the process continues to operation 870 to determine the most common value associated with each instance of the attribute. Referring to FIG. 3, EntityA metadata table 310 shows both tenant 1 and tenant 2 have the same attributes and values in rows 330A and 330D, respectively and thus these are the most common values for these common attributes. If there were multiple instances of same attributes having different values, the most common value selected would be the value that occurs most often (e.g., three out of five times) or randomly if there is a tie (e.g., four instances where two have one value and the other two have a different value). At operation 880, those determined most common values are copied into global metadata. As can be seen in FIG. 3, global EntityA metadata table has the same values in rows 360A and 360B as rows 330A and 330*d* (absent any tenant designations). Operations 820-880 are repeated for all properties, attributes and values from the compilation of properties data.

As can be seen in the rows 360A-360C FIG. 3, the value of the type, required, and label attributes of the properties prop1, prop2, and prop3 are the same as those in the rows 330A-330C. Only the first tenant uses the properties prop2 and prop3, so the values for the attributes of those properties are copied from the metadata of the first tenant. The two tenants have the same values for the properties of the property prop1, so those shared values are used in the row 360C.

With reference to FIGS. 4 and 5, tenant 1 is shown with properties prop1, prop2, prop3, prop4, prop5, prop6, prop7, prop8, prop9, prop10, and prop11. Tenant 2 is shown with properties prop1, prop2, prop3, prop4, prop5, prop6, prop7, prop8, prop9, prop12, and prop13. Accordingly, the compilation of the properties for the two tenants is prop1, prop2, prop3, prop4, prop5, prop6, prop7, prop8, prop9, prop10, prop11, prop12, and prop13. Thus, in operation 810, the thirteen <Property> tags shown in FIG. 6 are compiled and may be stored in an EntityA metadata table 310.

In FIGS. 4 and 5, the two tenants have the same values for all attributes of properties prop1, prop2, prop6, and prop8. Accordingly, the attributes of those properties and their values in the global properties 600 of FIG. 6 are set to those shared values (e.g., see operations 840-880). Only tenant 1 has values for the attributes of the properties prop10 and prop11. Thus, the attributes of those properties and their values in the global properties 600 are set to those unique values (e.g., see operations 850-860). Only tenant 2 has values for the attributes of the properties prop12 and prop13. As a result, the attributes of properties prop12 and prop13 and their values in the global properties 600 are set to those unique values (e.g., see operations 850-860).

The two tenants have different values for attributes of the properties prop3, prop4, prop5, prop7, and prop9. Since the number of tenants with each value is tied, the value for one of the tenants is selected and stored in the global properties 600 (e.g., see operations 850-880).

After the completion of operations 810-880, the global properties 600 of FIG. 6 or the global EntityA metadata table 340 of FIG. 3 is populated. When the global properties are combined with the tenant differences, discussed in more detail with respect to FIG. 9, below, the tenant metadata is recreated.

Figure 9:
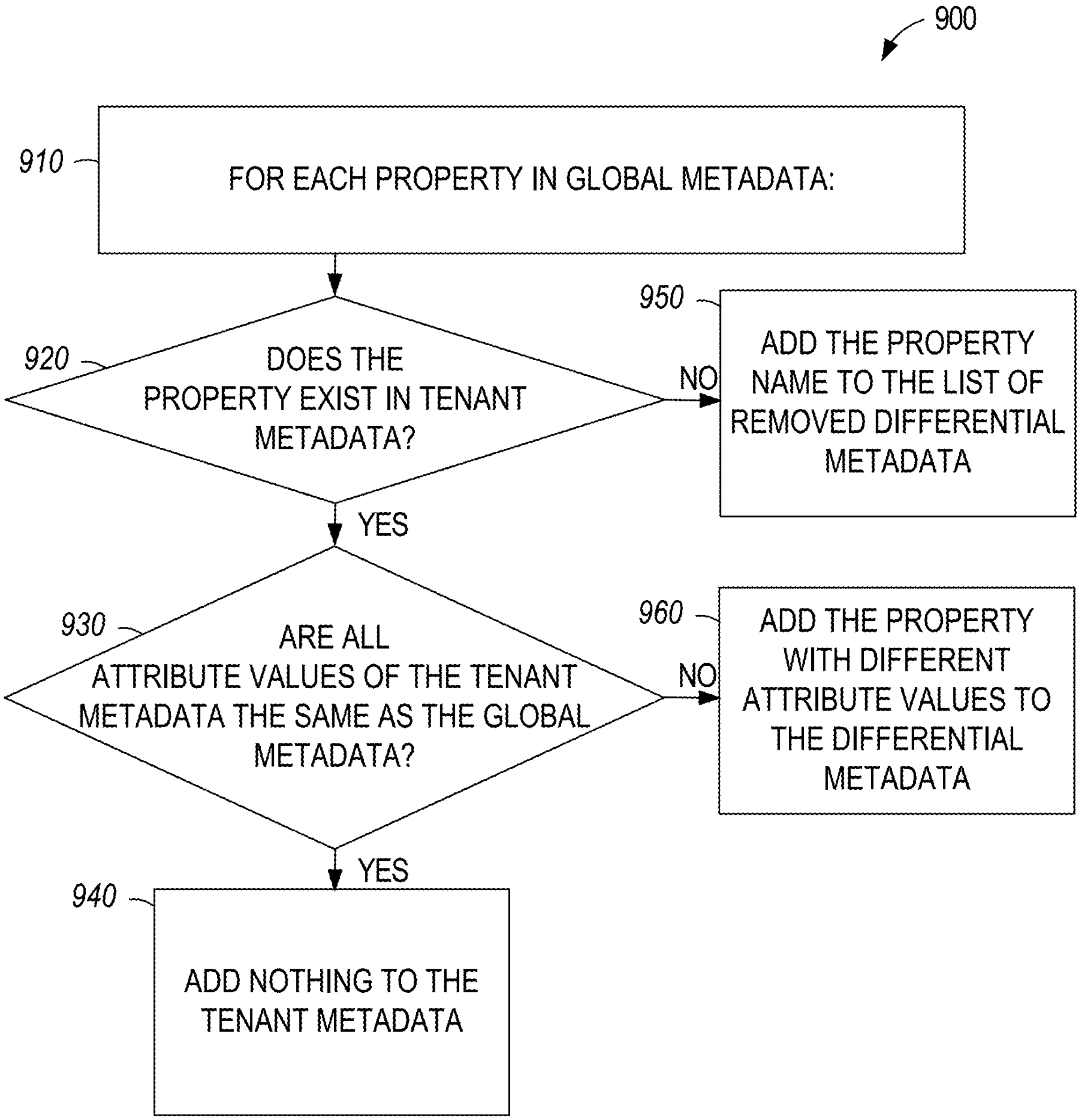
FIG. 9 shows a flowchart illustrating a method of generating tenant differences for metadata compression for cloud applications.

FIG. 9 shows a flowchart illustrating a method 900 of generating tenant differences for metadata compression for cloud applications. The method 900 is performed for each entity and tenant. By way of example, the method 900 will be described as being performed for the first tenant with data in the EntityA metadata table 310 of FIG. 3 or the set of properties 400 of FIG. 4. Operation 910 causes operations 920-960 (or appropriate subsets thereof) to be performed for each property in the global metadata. In this example, the first iteration is for the property prop1, of the row 360A of FIG. 3 or the first <Property> tag of the global properties 600 of FIG. 6.

In operation 920, the compression module 220 determines if the global property exists in the tenant metadata. The global property (e.g., row 360A) does exist in the tenant metadata for the first tenant, as seen in the row 330A of FIG. 3 or the tenant properties 400 of FIG. 4. Accordingly, the method 900 continues with operation 930.

The compression module 220, in operation 930, determines if all attribute values of the tenant metadata are the same as the attribute values of the global metadata for the property. In this case, the values for the attributes of the property prop1 are the same for the first tenant and the global properties (e.g., the attributes and values are the same in rows 330A and 360A). As a result, the method 900 continues with operation 940.

In operation 940, the compression module 220 handles the property by adding nothing to the tenant metadata. The method 900 continues by returning to operation 920 for the next property in the global metadata, prop2.

The property prop2 exists in the global metadata for the first tenant and the attribute values of the property are the same for the tenant as in the global properties. Accordingly, operations 920-940 are performed for the second property, and the method 900 continues by returning to operation 920 for prop3. The properties prop3 and prop4 are handled the same way, and no metadata for these properties is added to the tenant differences for the first tenant.

For the property prop5, in operation 920, the compression module 220 determines that the global property exists in the tenant metadata. In operation 930, the compression module 220 determines that at least one attribute value of the tenant for the property is different from the corresponding attribute value in the global metadata. In the global properties 600 of FIG. 6, the property has attributes of type, required, creatable, updatable, visible, sortable, filterable, and label. The tenant properties 400 has the same attributes. The values of the attributes of type, updatable, visible, sortable, filterable, and label are the same, but the values for the attributes of required and creatable are different. Since at least one attribute value is different, the method 900 continues with operation 960.

In operation 960, the compression module 220 adds the property to the differential metadata with the different attribute values. Thus, as can be seen in the differential metadata 700 of FIG. 7, a <Property> tag is included for the property prop5, and only the attributes with different values from those in the global properties 600 are included. After performance of operation 960, the method 900 continues with operation 920 for the next property.

In this way, properties prop6, prop7, prop8, prop9, prop10, and prop11 are handled. Each property is either skipped or else the differences are added to the tenant metadata.

When operation 920 is performed for the property prop12, the compression module 220 determines that the property does not exist in the tenant metadata, since there is no prop12 in the tenant properties 400 of FIG. 4. Accordingly, operation 950 is performed and the property name is added to the list of removed differential metadata. In the example of the differential metadata 700 of FIG. 7, this is accomplished by adding a <removed> tag with a value comprising a list of names of properties. Operations 920 and 950 are repeated for the property prop13, which is added to the value in the <removed> tag.

After all properties in the global properties 600 have been iterated over, the method 900 is complete. After completion of the method 900, the properties for the tenant may be encapsulated within <Entity>/</Entity> tags that identify the entity for which the differences are stored. When the method 900 has been performed for all entities of a tenant, the determination of the differences for the tenant is complete. The method 900 may be repeated for one or more entities for a second tenant, resulting in the creation of the differential metadata 750 of FIG. 7.

The methods 800 of FIG. 8 and 900 of FIG. 9 may be repeated periodically (e.g., daily or weekly). As a result, the total memory usage for storing the tenant metadata will be reduced. For example, if all tenants have a particular value for an attribute of a property of an entity at one time, that value will be stored in the global metadata alone. At a later time, if all tenants change to use a different value, the original value will be stored in the global metadata and the different value will be stored in each of the tenant differences, increasing the total memory usage. When the method 800 is repeated, the value in the global metadata will be updated to the new most common value. When the method 900 is repeated for each tenant, the value for the property will be removed from each of the tenant differences, reducing the total memory usage.

Figure 10:
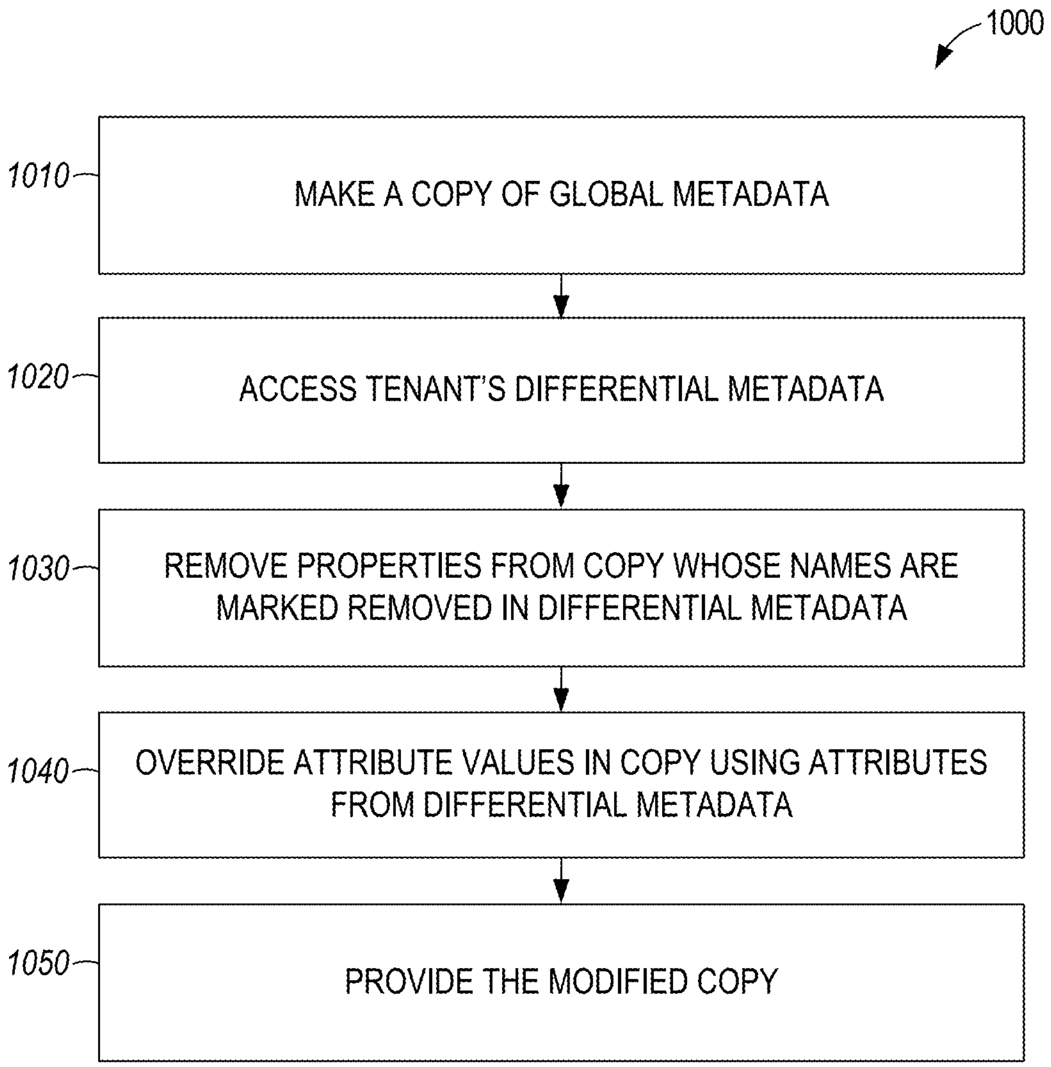
FIG. 10 shows a flowchart illustrating a method of accessing compressed metadata for cloud applications.

FIG. 10 shows a flowchart illustrating a method 1000 of accessing compressed metadata for cloud applications. The method 1000 is performed in response to a request for metadata for a tenant. By way of example, the method 1000 will be described as being performed for the first tenant with data in the EntityA metadata table 310 of FIG. 3 or the set of properties 400 of FIG. 4.

In operation 1010, the access module 230 makes a copy of global metadata. For example, data from the global EntityA metadata table 340 may be copied for the tenant. As another example, the data structure of FIG. 6 may be copied for the tenant.

The access module 230, in operation 1020, accesses the tenant's differential metadata. In this example, the differential metadata for the first tenant is stored in the row 390A of EntityA metadata differences table, with the tenant field equal to 1, or in the differential metadata 700 of FIG. 7.

In operation 1030, the access module 230 removes properties from the copy whose names are marked removed in the differential metadata. Using the data in the EntityA metadata differences table, no properties are marked as removed, so nothing would be performed in this step. With reference to the differential metadata 700 of FIG. 7, properties prop12 and prop13 are marked as removed. Accordingly, those properties are removed from the copy of the global properties 600.

The access module 230 overrides attribute values in the copy using attributes from the differential metadata (operation 1040). The row 390A indicates a difference from the row 360A by showing that the type attribute of the property prop3 should be long rather than string. Accordingly, in operation 1040, the value of the type attribute of prop3 for EntityA is changed for the first tenant. Similarly, the differential metadata 700 of FIG. 7 shows that two attribute values are changed for the property prop5 and one attribute value is changed for each of the properties prop7 and prop9. The indicated attribute values are changed in the copy of the global properties 600.

In operation 1050, the access module 230 provides the modified copy of the global data. The modified copy may be provided in response to the request for metadata of the tenant that caused execution of the method 1000. Thus, by use of the method 1000, access to metadata of a tenant is provided even while storage for the metadata of the tenant is reduced using differential compression.

Figure 11:
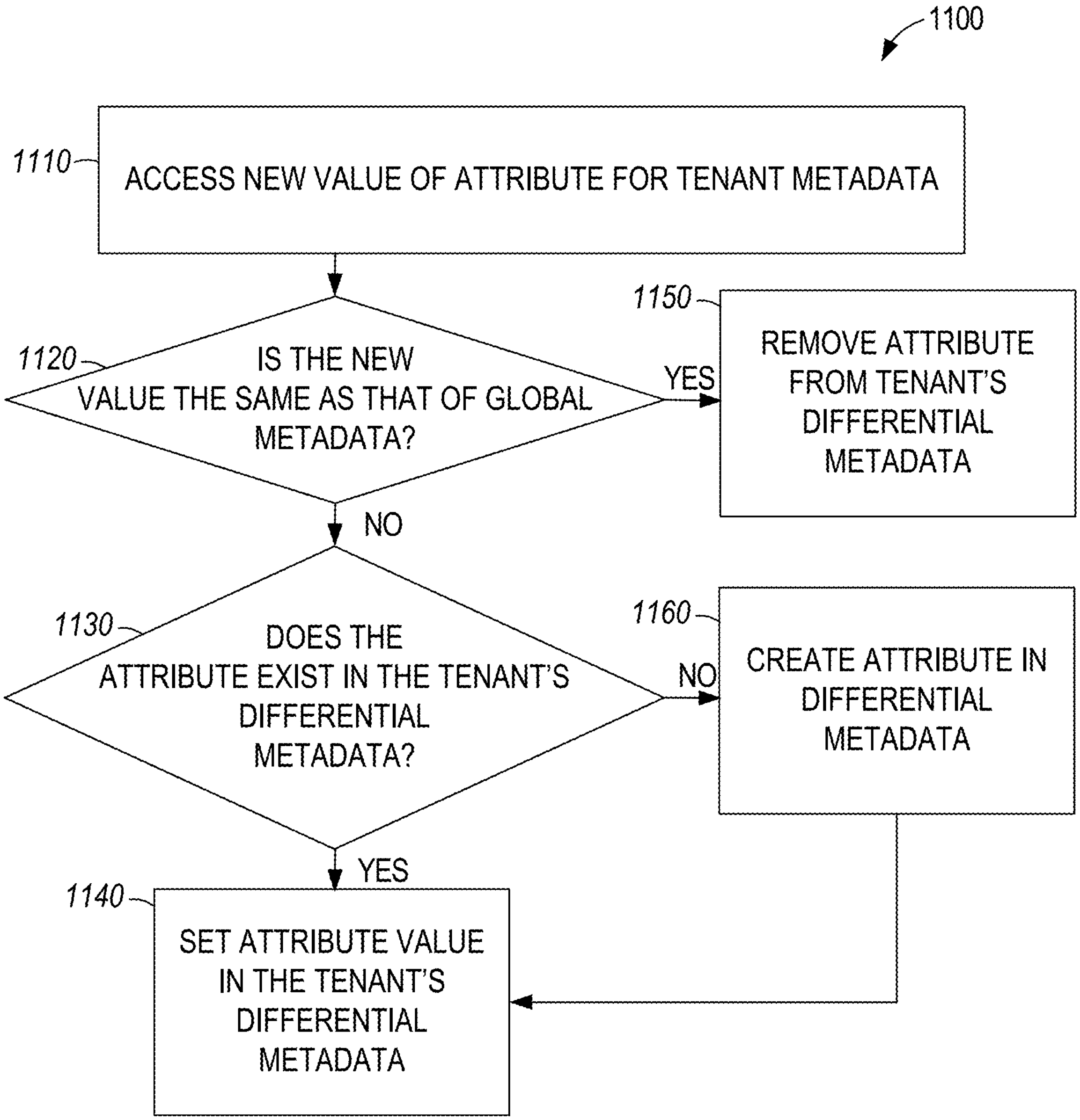
FIG. 11 shows a flowchart illustrating a method of updating compressed metadata for cloud applications.

FIG. 11 shows a flowchart illustrating a method 1100 of updating compressed metadata for cloud applications. The method 1100 is performed in response to a request to modify metadata for a tenant. By way of example, the method 1100 will be described as being performed for the first tenant after performance of the method 1000.

In operation 1110, the access module 230 accesses a new value of an attribute for tenant metadata. In a first example, the value of the filterable property of prop7 for the first tenant is being changed from "true," as shown in FIG. 7, to "false."

The access module 230 determines, in operation 1120, if the new value is the same as the value for the property in the global metadata. In the first example, the new value is the same, as can be seen by inspection of FIG. 6. Accordingly, the method 1100 continues with operation 1150.

In operation 1150, the access module 230 removes the attribute from the tenant's differential metadata. Accordingly, the <Property> tag for the property prop7 would be removed from the differential metadata 700 of FIG. 7 such that the generation of prop7 for the first tenant would rely on the values in the global metadata.

In a second example, the value of the required property of prop1 for the first tenant is being changed from "true" to "false." In operation 1110, the access module 230 accesses the new value of the attribute for the tenant metadata. In operation 1120, the access module determines if the new value is the same as the value for the property in the global metadata. In the second example, the new value is different, as can be seen by inspection of FIG. 6. Accordingly, the method 1100 continues with operation 1130.

The access module 230, in operation 1130, determines if the attribute already exists in the tenant's differential metadata. In the second example, the attribute does not already exist in the differential metadata 700 of FIG. 7. Accordingly, the method 1100 continues with operation 1160.

In operation 1160, the access module 230 creates the attribute in the differential metadata with the new value. In the second example, the metadata below is inserted within the <EntityA> tags.

```
<Property name = "prop1" required = "false"/>
```

In a third example, the value of the creatable attribute of the property prop5 is changed from "true" to "may be," In operation 1110, the access module 230 accesses the new value of the attribute for the tenant metadata. In operation 1120, the access module determines if the new value is the same as the value for the property in the global metadata. In the third example, the new value is different, as can be seen by inspection of FIG. 6. Accordingly, the method 1100 continues with operation 1130.

The access module 230, in operation 1130, determines if the attribute already exists in the tenant's differential metadata. In the third example, the attribute already exists in the differential metadata 700 of FIG. 7. Accordingly, the method 1100 continues with operation 1140.

In operation 1140, the access module 230 sets the attribute value in the tenant's differential metadata. Thus, the entry in the tenant's metadata for prop5 is modified from its original form as shown in FIG. 7 to the metadata below.

⟨Property name = "*prop*5" required = "true" creatable = "maybe"/⟩

Thus, by use of the method 1100, tenant metadata can be modified without decompressing the compressed metadata, improving performance of the cloud provider.

Figure 12:
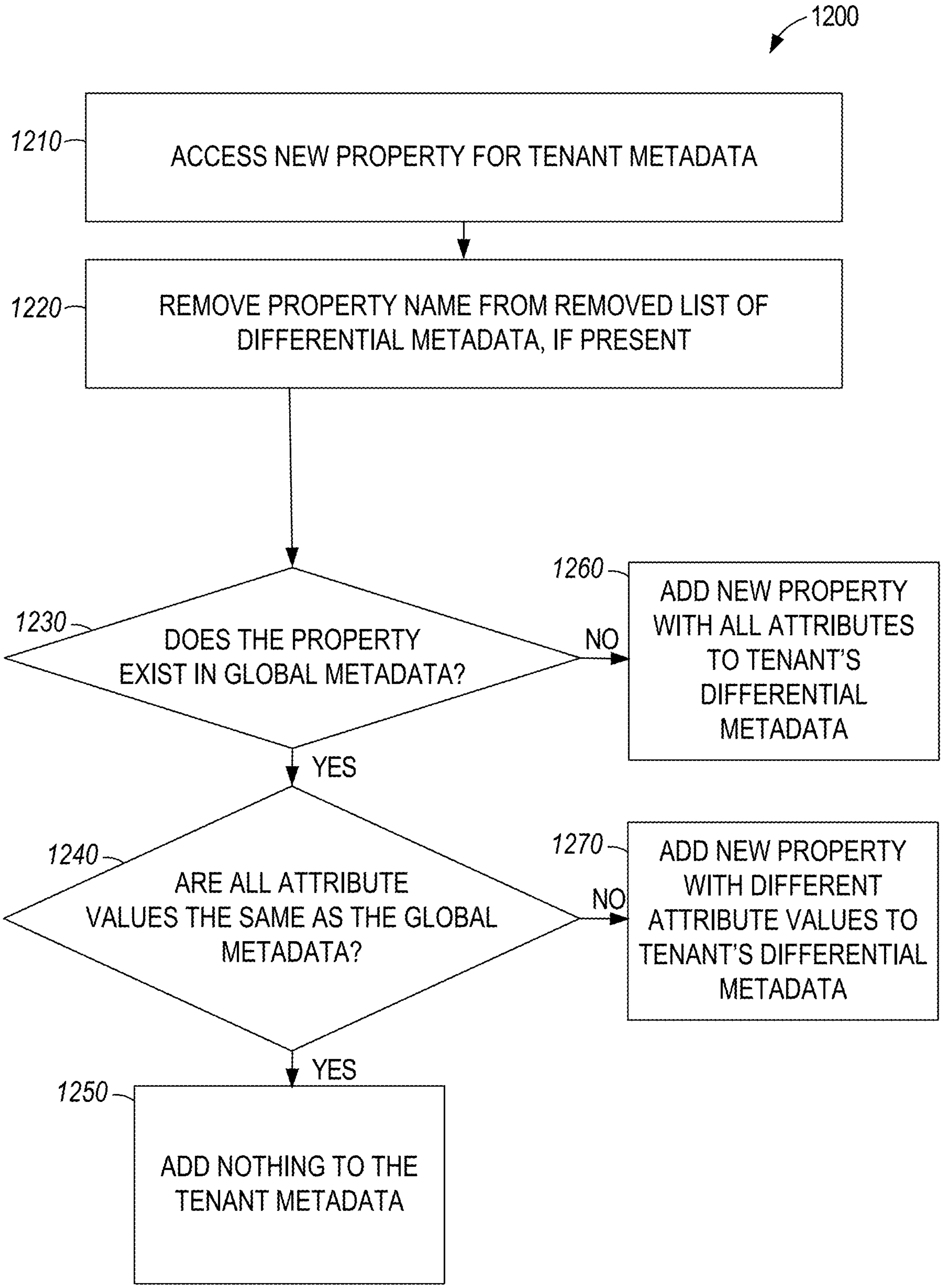
FIG. 12 shows a flowchart illustrating a method of updating compressed metadata for cloud applications.

FIG. 12 shows a flowchart illustrating a method 1200 of updating compressed metadata for cloud applications. The method 1200 is performed in response to a request to modify metadata for a tenant. By way of example, the method 1200 will be described as being performed for the first tenant after performance of the method 1000. The methods 1100 and 1200 are similar in that they both modify compressed tenant metadata. The method 1100 operates to modify a value for an attribute of a property that is already part of the tenant metadata. The method 1200 operates to add a new property to the tenant metadata.

In operation 1210, the access module 230 accesses a new property for tenant metadata. In a first example, the property below is being added.

⟨Property name = "*prop*12" type = "Double" required =
"false" creatable = "true" updatable = "true" visible =
"true" sortable = "false" filterable = "false" label = "Property 79" … /⟩

The access module 230, in operation 1220, removes the property name from a removed list of differential metadata, if present. The differential metadata 700 of FIG. 7 shows prop12 in a removed list. Accordingly, prop12 is removed from the removed list in operation 1220. As a result, the removed list is updated as shown below.

⟨removed value = "*prop*13"/⟩

In operation 1230, the access module 230 determines if the property exists in global metadata. In the first example, the property prop12 does exist. Accordingly, the method 1200 continues with operation 1240.

The access module 230 determines, in operation 1240, if all attributes of the new property have the same values as the attributes in the global metadata. In the first example, they do. Accordingly, the method continues with operation 1250.

In operation 1250, nothing is added to the tenant metadata. By removing the property from the removed list, the tenant metadata automatically gains all values of the attributes from the global metadata.

In a second example, the new property for tenant metadata accessed in operation 1210 is shown below.

⟨Property name = "*prop*12" type =
"Integer" required = "false" creatable = "true" updatable = "true" visible =
"true" sortable = "false" filterable = "false" label = "Property 79" … /⟩

As in the first example, the property prop12 is removed from the removed list in operation 1220 and the property is found to exist in global metadata in operation 1230. However, in the second example, all attribute values are not the same as the global metadata since the value of the type attribute is Integer. As a result, the method 1200 continues with the operation 1270 instead of the operation 1250.

In operation 1270, the access module 230 adds a new property with the different attribute values to the tenant's differential metadata. In the second example, the new metadata entry below is added to the tenant's differential metadata.

⟨Property name = "*prop*12" type = "Interger"/⟩

In a third example, the new property for tenant metadata accessed in operation 1210 is:

⟨Property name = "*prop*14" required = "true"/⟩

The new property is not in the removed list, so it is not removed from the removed list in operation 1220. The property is determined not to exist in the global metadata in operation 1230. Accordingly, the method 1200 continues with operation 1260.

In operation 1260, the access module 230 adds the new property with all attributes to the tenant's differential metadata. Thus, by use of the method 1200, new properties can be added to tenant metadata without decompressing the compressed metadata, thereby improving performance of the cloud provider.

Figure 13:
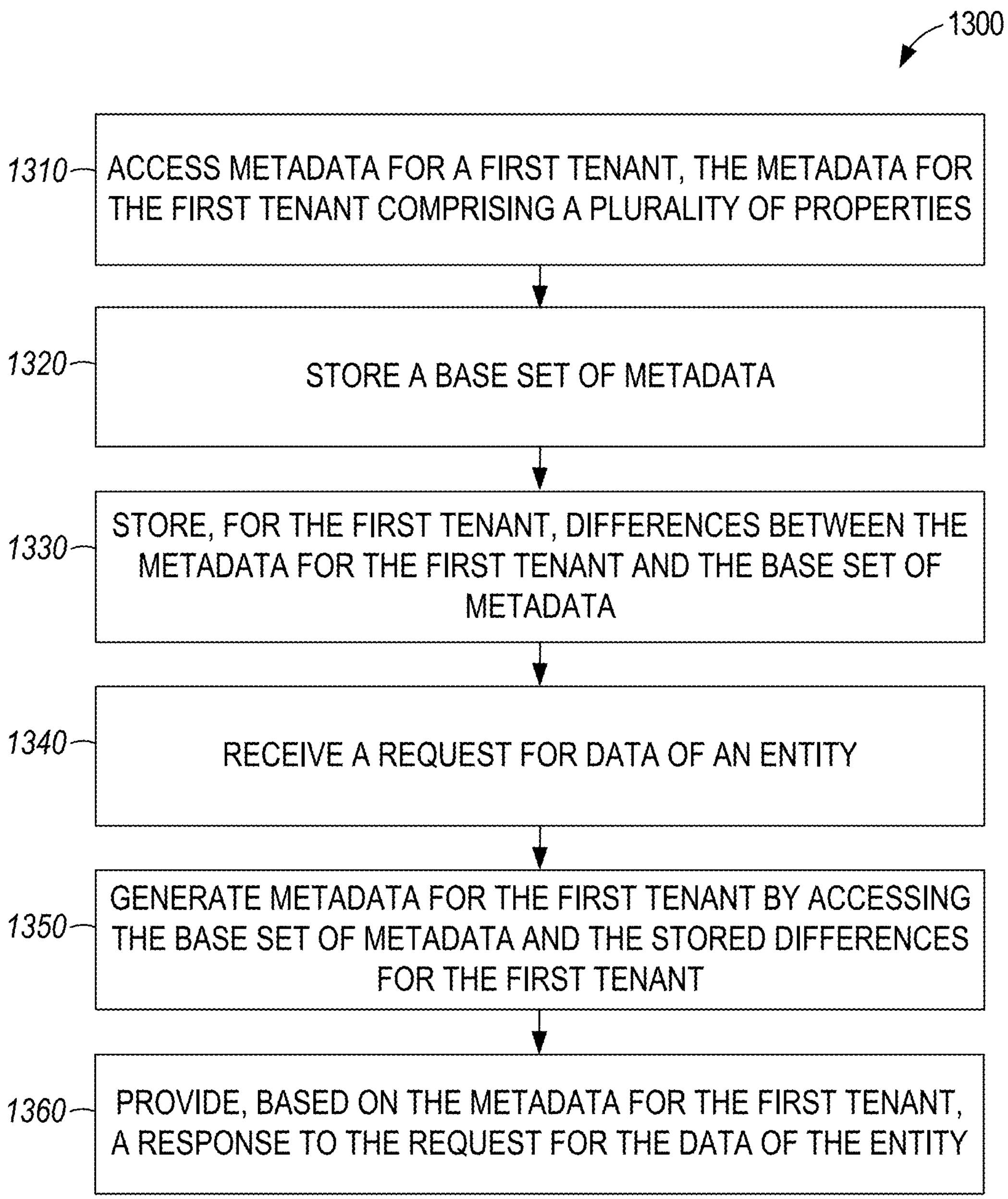
FIG. 13 shows a flowchart illustrating a method of metadata compression for cloud applications.

FIG. 13 shows a flowchart illustrating a method 1300 of metadata compression for cloud applications. The method 1300 includes operations 1310, 1320, 1330, and 1340. By way of example and not limitation, the method 1300 is described as being performed by the application server 130A of FIG. 1 using the modules of FIG. 2.

In operation 1310, the compression module 220 accesses metadata for a first tenant, the metadata for the first tenant comprising a plurality of properties. Operation 1310 may be repeated for additional tenants (e.g., such that the operation is performed for each tenant of a plurality of tenants). For example, the properties 400 of FIG. 4 for a first tenant and the properties 500 of FIG. 5 for a second tenant may be accessed.

The compression module 220, in operation 1320, stores a base set of metadata. The method 800 of FIG. 8 may be used to determine the values of attributes of properties in global metadata. The global metadata may be used as the base set of metadata.

In operation 1330, the compression module 220 stores, for the first tenant, differences between the metadata for the first tenant and the base set of metadata. Operation 1330 may be repeated for additional tenants (e.g., such that the operation is performed for each tenant of the plurality of tenants). The method 900 of FIG. 9 may be used to store the differences for each tenant in differential metadata, such as that shown in FIG. 7. The storing of the differences between the metadata for the tenant and the base set of metadata may comprise, for a property of the base set of metadata, indicating that the property is removed from the metadata for the tenant, as discussed in more detail with respect to operation 950 of the method 900. The storing of the differences between the metadata for the tenant and the base set of metadata may comprise, for a property of the base set of metadata, not storing a value for the property for the tenant, as discussed in more detail with respect to operation 940 of the method 900. The storing of the differences between the metadata for the tenant and the base set of metadata may comprise, for a property of the base set of metadata, storing a value for an attribute of the property for the tenant that is different from the value of the attribute of the property of the base set of metadata, as discussed in more detail with respect to operation 960 of the method 900.

The application server 130A, in operation 1340, receives a request for data of an entity. For example, a user of the client device 160A of FIG. 1 may interact with the web interface 170 to cause an application running on the client device 160A to send, to the network-based application 110, a request for data of a purchase order. The request is communicated via the network 190 and received by the application server 130A.

The access module 230, in operation 1350, generates metadata for the first tenant by accessing the base set of metadata and the stored differences for the first tenant. In some example embodiments, the method 1000 of FIG. 10 is used to generate the metadata for the first tenant.

In operation 1360, the application server 130A provides a response to the request for the data of the entity. The response is based on the metadata for the first tenant. For example, a database may include many properties for the entity, but the response may include only those that are identified by the metadata for the first tenant as being part of the entity. As a result, a user belonging to a first tenant may be provided different data for a particular entity than a user belonging to a second tenant would be provided.

By use of the method 1300, metadata for a plurality of tenants is compressed and the compressed metadata for a tenant is restored for access. Thus, memory resources of a cloud provider are saved with no loss in functionality.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory hierarchy comprised of at least a first level memory and a second level memory; and one or more processors coupled to the memory hierarchy and configured to execute instructions to perform operations comprising: receive a first data execution instruction for a first tenant; determine that a first tenant metadata set associated with the first tenant is not in the first level memory; copy a global metadata set into the first level memory to generate a first tenant copy of the global metadata set; modify the first tenant copy of the global metadata set in the first level memory using a first tenant differential metadata set to generate the first tenant metadata set; and execute the first data execution instruction for the first tenant on a first tenant data object using at least a portion of the first tenant metadata set.

In Example 2, the subject matter of Example 1, wherein the operations further comprise: receive a second data execution instruction for a second tenant; determine that a second tenant metadata set associated with the second tenant is not in the first level memory; copy the global metadata set into the first level memory to generate a second tenant copy of the global metadata set; modify the second tenant copy of the global metadata set in the first level memory using a second tenant differential metadata set to generate the second tenant metadata set; and execute the second data execution instruction for the second tenant on a second tenant data object using at least a portion of the second tenant metadata set.

In Example 3, the subject matter of Examples 1-2, wherein: the first level memory is a cache; the second level memory is a main memory; and the first tenant copy of the global metadata set is generated by copying the global metadata set from a first position in the cache to a second, different position in the cache.

In Example 4, the subject matter of Examples 1-3, wherein: the first level memory is a level one cache; the second level memory is a level two cache; and the first tenant copy of the global metadata set is generated by copying the global metadata set from the level two cache to the level one cache.

In Example 5, the subject matter of Examples 1-4, wherein the global metadata set comprises metadata for an entity and the metadata for the entity comprises a value for an attribute of the entity.

In Example 6, the subject matter of Examples 1-5, wherein: the first tenant metadata set comprises metadata for an entity; the metadata for the entity comprises a value for an attribute of the entity; and the portion of the first tenant metadata set used to execute the first data execution instruction includes the value of the attribute of the entity.

In Example 7, the subject matter of Examples 1-6, wherein the modifying of the first tenant copy of the global metadata set in the first level memory using the first tenant differential metadata set to generate the first tenant metadata set comprises removing, from the first tenant copy, properties that are indicated as being removed in the first tenant differential metadata set.

In Example 8, the subject matter of Examples 1-7, wherein the modifying of the first tenant copy of the global metadata set in the first level memory using the first tenant differential metadata set to generate the first tenant metadata set comprises removing, from the first tenant copy, an attribute of a property that is indicated as being removed in the first tenant differential metadata set.

In Example 9, the subject matter of Examples 1-8, wherein the modifying of the first tenant copy of the global metadata set in the first level memory using the first tenant differential metadata set to generate the first tenant metadata set comprises overwriting attribute values in the first tenant copy with attribute values in the first tenant differential metadata set.

In Example 10, the subject matter of Examples 1-9, wherein the modifying of the first tenant copy of the global metadata set in the first level memory using the first tenant differential metadata set to generate the first tenant metadata set comprises adding, to the first tenant copy, an attribute of a property that is indicated as being added in the first tenant differential metadata set.

In Example 11, the subject matter of Examples 1-10, wherein the operations further comprise: generating the global metadata set by: compiling properties of an entity from all tenants; for each property in the compilation, if the property appears only once in the compilation, copying the property, attributes of the property, and values of the attributes into the global metadata set; and for each property in the compilation, if the property appears more than once in the compilation: for each attribute in the property, if the attribute appears only once among the appearances of the property, copying the attribute and a value of the attribute into the global metadata set; and for each attribute in the property, if the attribute appears more than once among the appearances of the property: determining a most common value of the attribute; and copying the most common value of the attribute into the global metadata set.

Example 12 is a non-transitory computer-readable medium that stores instructions that, when executed by one or more processors, cause the one or more processors to perform operations comprising: receive a first data execution instruction for a first tenant; determine that a first tenant metadata set associated with the first tenant is not in a first level memory of a memory hierarchy that comprises the first level memory and a second level memory; copy a global metadata set into the first level memory to generate a first tenant copy of the global metadata set; modify the first tenant copy of the global metadata set in the first level memory using a first tenant differential metadata set to generate the first tenant metadata set; and execute the first data execution instruction for the first tenant on a first tenant data object using at least a portion of the first tenant metadata set.

In Example 13, the subject matter of Example 12, wherein the operations further comprise: receive a second data execution instruction for a second tenant; determine that a second tenant metadata set associated with the second tenant is not in the first level memory; copy the global metadata set into the first level memory to generate a second tenant copy of the global metadata set; modify the second tenant copy of the global metadata set in the first level memory using a second tenant differential metadata set to generate the second tenant metadata set; and execute the second data execution instruction for the second tenant on a second tenant data object using at least a portion of the second tenant metadata set.

In Example 14, the subject matter of Examples 12-13, wherein: the first level memory is a cache; the second level memory is a main memory; and the first tenant copy of the global metadata set is generated by copying the global metadata set from a first position in the cache to a second, different position in the cache.

In Example 15, the subject matter of Examples 12-14, wherein: the first level memory is a level one cache; the second level memory is a level two cache; and the first tenant copy of the global metadata set is generated by copying the global metadata set from the level two cache to the level one cache.

In Example 16, the subject matter of Examples 12-15, wherein the global metadata set comprises metadata for an entity and the metadata for the entity comprises a value for an attribute of the entity.

In Example 17, the subject matter of Examples 12-16, wherein: the first tenant metadata set comprises metadata for an entity; the metadata for the entity comprises a value for an attribute of the entity; and the portion of the first tenant metadata set used to execute the first data execution instruction includes the value of the attribute of the entity.

Example 18 is a method comprising: receiving, by one or more hardware processors, a first data execution instruction for a first tenant; determining that a first tenant metadata set associated with the first tenant is not in a first level memory of a memory hierarchy that comprises the first level memory and a second level memory; copying a global metadata set into the first level memory to generate a first tenant copy of the global metadata set; modifying the first tenant copy of the global metadata set in the first level memory using a first tenant differential metadata set to generate the first tenant metadata set; and executing the first data execution instruction for the first tenant on a first tenant data object using at least a portion of the first tenant metadata set.

In Example 19, the subject matter of Example 18 includes receiving a second data execution instruction for a second tenant; determining that a second tenant metadata set associated with the second tenant is not in the first level memory; copying the global metadata set into the first level memory to generate a second tenant copy of the global metadata set; modifying the second tenant copy of the global metadata set in the first level memory using a second tenant differential metadata set to generate the second tenant metadata set; and executing the second data execution instruction for the second tenant on a second tenant data object using at least a portion of the second tenant metadata set.

In Example 20, the subject matter of Examples 18-19, wherein: the first level memory is a cache; the second level memory is a main memory; and the first tenant copy of the global metadata set is generated by copying the global metadata set from a first position in the cache to a second, different position in the cache.

Example 21 is an apparatus comprising means to implement any of Examples 1-20.

Figure 14:
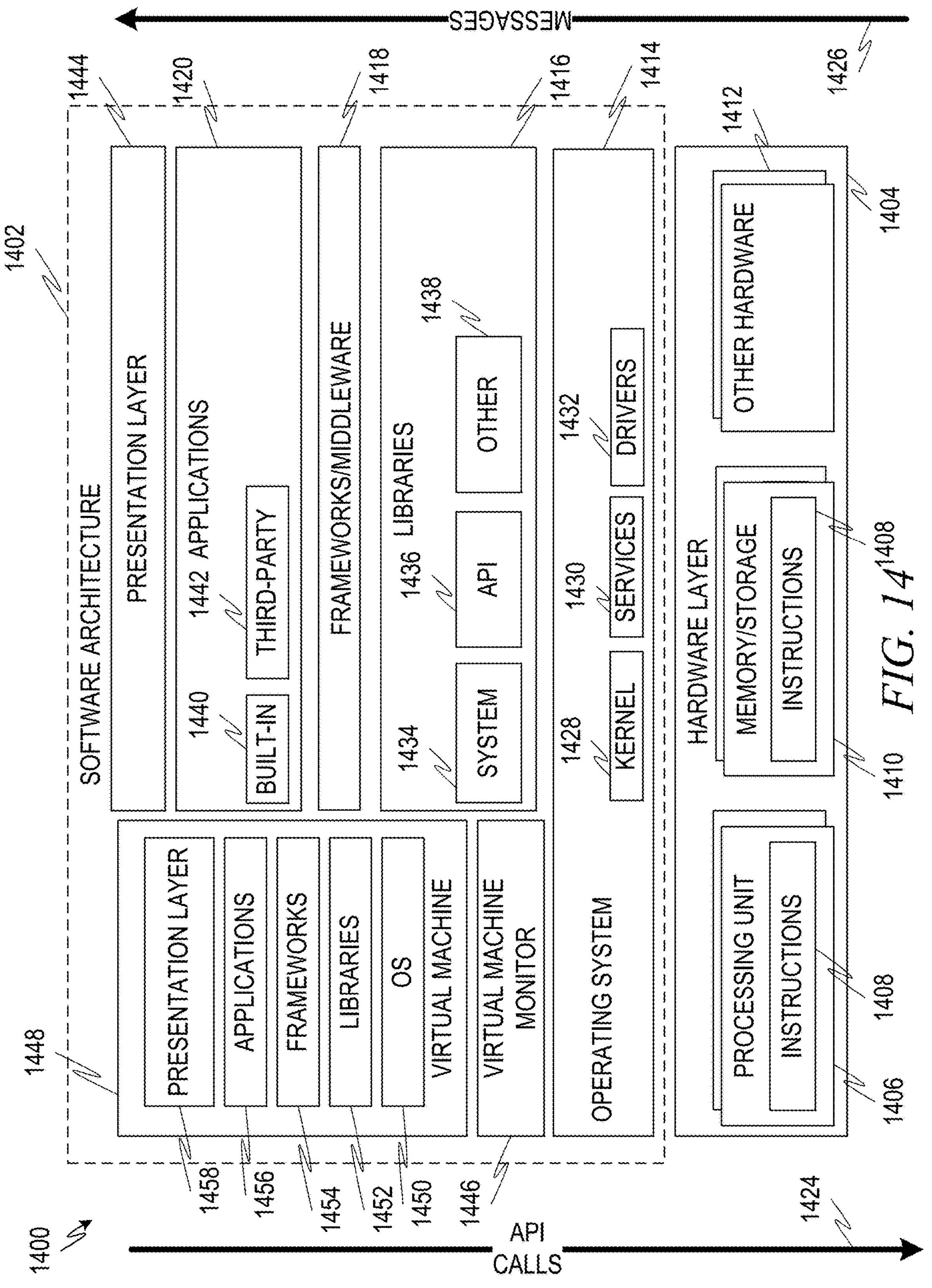
FIG. 14 shows a block diagram showing one example of a software architecture for a computing device.

FIG. 14 shows a block diagram 1400 showing one example of a software architecture 1402 for a computing device. The software architecture 1402 may be used in conjunction with various hardware architectures, for example, as described herein. FIG. 14 is merely a non-limiting example of a software architecture, and many other architectures may be implemented to facilitate the functionality described herein. A representative hardware layer 1404 is illustrated and can represent, for example, any of the above referenced computing devices. In some examples, the hardware layer 1404 may be implemented according to the architecture of the computer system of FIG. 14.

The representative hardware layer 1404 comprises one or more processing units 1406 having associated executable instructions 1408. Executable instructions 1408 represent the executable instructions of the software architecture 1402, including implementation of the methods, modules, subsystems, and components, and so forth described herein and may also include memory and/or storage modules 1410, which also have executable instructions 1408. Hardware layer 1404 may also comprise other hardware as indicated by other hardware 1412 which represents any other hardware of the hardware layer 1404, such as the other hardware illustrated as part of the software architecture 1402.

In the example architecture of FIG. 14, the software architecture 1402 may be conceptualized as a stack of layers where each layer provides particular functionality. For example, the software architecture 1402 may include layers such as an operating system 1414, libraries 1416, frameworks/middleware 1418, applications 1420, and presentation layer 1444. Operationally, the applications 1420 and/or other components within the layers may invoke API calls 1424 through the software stack and access a response, returned values, and so forth illustrated as messages 1426 in response to the API calls 1424. The layers illustrated are representative in nature and not all software architectures have all layers. For example, some mobile or special purpose operating systems may not provide a frameworks/middleware 1418 layer, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. In some examples, the services 1430 include an interrupt service. The interrupt service may detect the receipt of an interrupt and, in response, cause the software architecture 1402 to pause its current processing and execute an interrupt service routine (ISR) when an interrupt is accessed.

The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than to interface directly with the underlying operating system 1414 functionality (e.g., kernel 1428, services 1430 and/or drivers 1432). The libraries 1416 may include system libraries 1434 (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks/middleware 1418 may provide a higher-level common infrastructure that may be utilized by the applications 1420 and/or other software components/modules. For example, the frameworks/middleware 1418 may provide various graphical user interface (GUI) functions, high-level resource management, high-level location services, and so forth. The frameworks/middleware 1418 may provide a broad spectrum of other APIs that may be utilized by the applications 1420 and/or other software components/modules, some of which may be specific to a particular operating system or platform.

The applications 1420 include built-in applications 1440 and/or third-party applications 1442. Examples of representative built-in applications 1440 may include, but are not limited to, a contacts application, a browser application, a book reader application, a location application, a media application, a messaging application, and/or a game application. Third-party applications 1442 may include any of the built-in applications 1440 as well as a broad assortment of other applications. In a specific example, the third-party application 1442 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1442 may invoke the API calls 1424 provided by the mobile operating system such as operating system 1414 to facilitate functionality described herein.

The applications 1420 may utilize built-in operating system functions (e.g., kernel 1428, services 1430 and/or drivers 1432), libraries (e.g., system libraries 1434, API libraries 1436, and other libraries 1438), and frameworks/middleware 1418 to create UIs to interact with users of the system. Alternatively, or additionally, in some systems, interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware computing device. A virtual machine is hosted by a host operating system (operating system 1414) and typically, although not always, has a virtual machine monitor 1446, which manages the operation of the virtual machine 1448 as well as the interface with the host operating system (i.e., operating system 1414). A software architecture executes within the virtual machine 1448 such as an operating system 1450, libraries 1452, frameworks/middleware 1454, applications 1456 and/or presentation layer 1458. These layers of software architecture executing within the virtual machine 1448 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array [FPGA] or an application-specific integrated circuit [ASIC]) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 15:
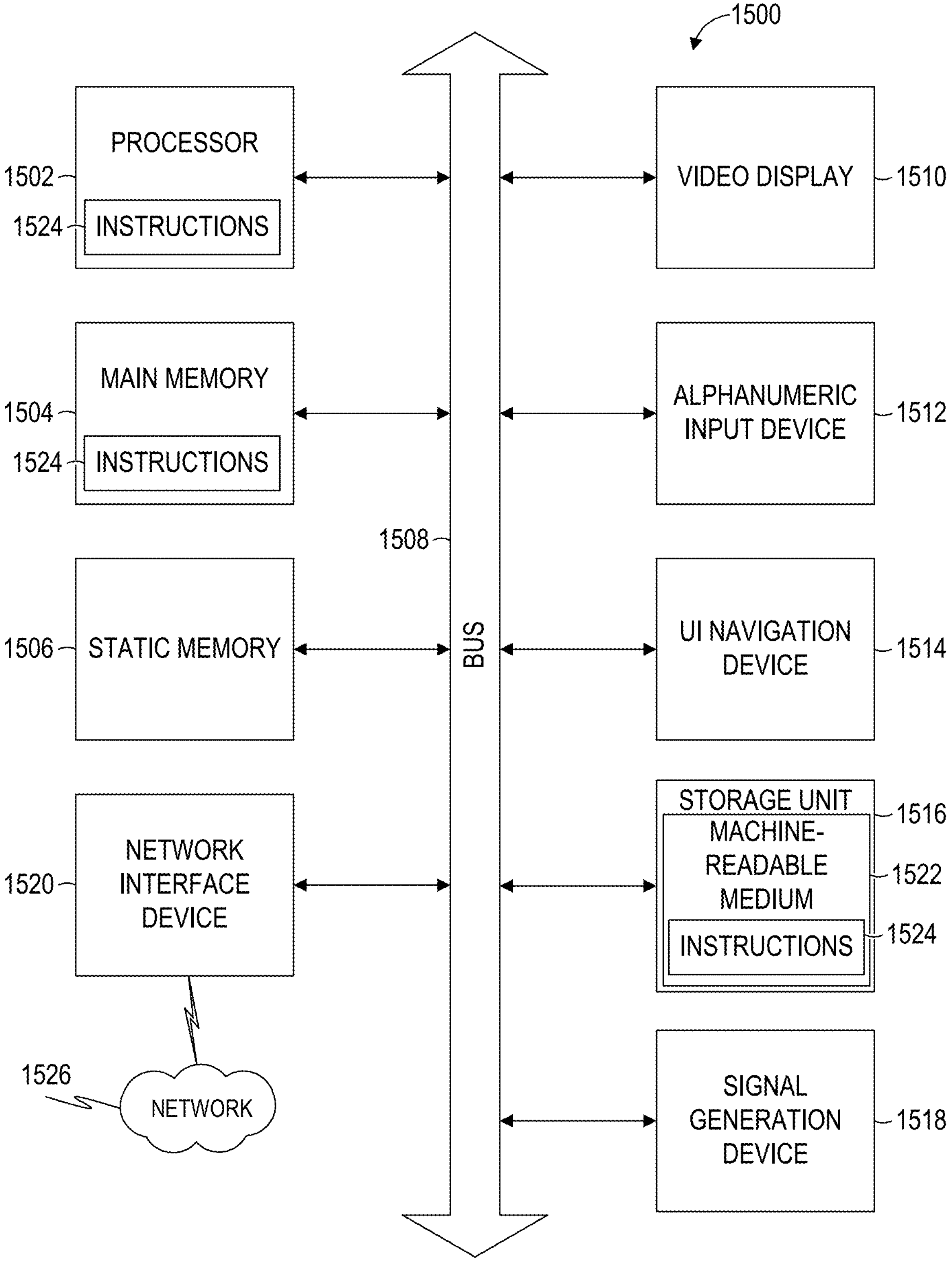
FIG. 15 shows a block diagram of a machine in the example form of a computer system within which instructions may be executed for causing the machine to perform any one or more of the methodologies discussed herein.

FIG. 15 shows a block diagram of a machine in the example form of a computer system 1500 within which instructions 1524 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU), or both), a main memory 1504, and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard or a touch-sensitive display screen), a UI navigation (or cursor control) device 1514 (e.g., a mouse), a storage unit 1516, a signal generation device 1518 (e.g., a speaker), and a network interface device 1520.

Machine-Readable Medium

The storage unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, with the main memory 1504 and the processor 1502 also constituting a machine-readable medium 1522.

While the machine-readable medium 1522 is shown in FIG. 15 to be a single medium, the term "machine-readable medium" may include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding, or carrying instructions 1524 for execution by the machine and that cause the machine to perform any one or more of the methodologies of the present disclosure, or that is capable of storing, encoding, or carrying data structures utilized by or associated with the instructions 1524. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1524 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:

a memory hierarchy comprised of at least a first level memory that is a cache and a second level memory that is a main memory; and one or more hardware processors coupled to the memory hierarchy and configured to execute instructions to perform operations comprising:

generate a global metadata set by:

compiling properties of an entity from all tenants;

for each property in the compilation, if the property appears only once in the compilation, copying the property, attributes of the property, and values of the attributes into the global metadata set; and for each property in the compilation, if the property appears more than once in the compilation:

for each attribute in the property, if the attribute appears only once among the appearances of the property, copying the attribute and a value of the attribute into the global metadata set; and for each attribute in the property, if the attribute appears more than once among the appearances of the property:

determining a most common value of the attribute; and copying the most common value of the attribute into the global metadata set;

receive a first data execution instruction for a first tenant;

determine that a first tenant metadata set associated with the first tenant is not in the first level memory;

generate a first tenant copy of the global metadata set by copying the global metadata set from a first position in the cache to a second, different position in the cache;

modify the first tenant copy of the global metadata set in the first level memory using a first tenant differential metadata set to generate the first tenant metadata set; and execute the first data execution instruction for the first tenant on a first tenant data object using at least a portion of the first tenant metadata set.

2. The system of claim 1, wherein the operations further comprise:

receive a second data execution instruction for a second tenant;

determine that a second tenant metadata set associated with the second tenant is not in the first level memory;

copy the global metadata set into the first level memory to generate a second tenant copy of the global metadata set;

modify the second tenant copy of the global metadata set in the first level memory using a second tenant differential metadata set to generate the second tenant metadata set; and execute the second data execution instruction for the second tenant on a second tenant data object using at least a portion of the second tenant metadata set.

3. The system of claim 1, wherein the global metadata set comprises metadata for the entity and the metadata for the entity comprises a value for the attribute of the entity.

4. The system of claim 1, wherein:

the first tenant metadata set comprises metadata for the entity;

the metadata for the entity comprises a value for the attribute of the entity; and the portion of the first tenant metadata set used to execute the first data execution instruction includes the value of the attribute of the entity.

5. The system of claim 1, wherein the modifying of the first tenant copy of the global metadata set in the first level memory using the first tenant differential metadata set to generate the first tenant metadata set comprises removing, from the first tenant copy, properties that are indicated as being removed in the first tenant differential metadata set.

6. The system of claim 1, wherein the modifying of the first tenant copy of the global metadata set in the first level memory using the first tenant differential metadata set to generate the first tenant metadata set comprises removing, from the first tenant copy, the attribute of the property that is indicated as being removed in the first tenant differential metadata set.

7. The system of claim 1, wherein the modifying of the first tenant copy of the global metadata set in the first level memory using the first tenant differential metadata set to generate the first tenant metadata set comprises overwriting attribute values in the first tenant copy with attribute values in the first tenant differential metadata set.

8. The system of claim 1, wherein the modifying of the first tenant copy of the global metadata set in the first level memory using the first tenant differential metadata set to generate the first tenant metadata set comprises adding, to the first tenant copy, the attribute of the property that is indicated as being added in the first tenant differential metadata set.

9. A non-transitory computer-readable medium that stores instructions that, when executed by one or more hardware processors, cause the one or more hardware processors to perform operations comprising:

generate a global metadata set by:

compiling properties of an entity from all tenants;

for each property in the compilation, if the property appears only once in the compilation, copying the property, attributes of the property, and values of the attributes into the global metadata set; and for each property in the compilation, if the property appears more than once in the compilation:

for each attribute in the property, if the attribute appears only once among the appearances of the property, copying the attribute and a value of the attribute into the global metadata set; and for each attribute in the property, if the attribute appears more than once among the appearances of the property:

determining a most common value of the attribute; and copying the most common value of the attribute into the global metadata set;

receive a first data execution instruction for a first tenant;

determine that a first tenant metadata set associated with the first tenant is not in a first level memory of a memory hierarchy that comprises the first level memory and a second level memory, wherein the first level memory is a cache and the second level memory is a main memory;

generate a first tenant copy of the global metadata set by copying the global metadata set from a first position in the cache to a second, different position in the cache;

modify the first tenant copy of the global metadata set in the first level memory using a first tenant differential metadata set to generate the first tenant metadata set; and execute the first data execution instruction for the first tenant on a first tenant data object using at least a portion of the first tenant metadata set.

10. The non-transitory computer-readable medium of claim 9, wherein the operations further comprise:

receive a second data execution instruction for a second tenant;

determine that a second tenant metadata set associated with the second tenant is not in the first level memory;

copy the global metadata set into the first level memory to generate a second tenant copy of the global metadata set;

modify the second tenant copy of the global metadata set in the first level memory using a second tenant differential metadata set to generate the second tenant metadata set; and execute the second data execution instruction for the second tenant on a second tenant data object using at least a portion of the second tenant metadata set.

11. The non-transitory computer-readable medium of claim 9, wherein the global metadata set comprises metadata for the entity and the metadata for the entity comprises a value for the attribute of the entity.

12. The non-transitory computer-readable medium of claim 9, wherein:

the first tenant metadata set comprises metadata for the entity;

the metadata for the entity comprises a value for the attribute of the entity; and the portion of the first tenant metadata set used to execute the first data execution instruction includes the value of the attribute of the entity.

13. A method comprising:

generating a global metadata set by:

compiling properties of an entity from all tenants;

for each property in the compilation, if the property appears only once in the compilation, copying the property, attributes of the property, and values of the attributes into the global metadata set; and for each property in the compilation, if the property appears more than once in the compilation:

for each attribute in the property, if the attribute appears only once among the appearances of the property, copying the attribute and a value of the attribute into the global metadata set; and for each attribute in the property, if the attribute appears more than once among the appearances of the property:

determining a most common value of the attribute; and copying the most common value of the attribute into the global metadata set;

receiving, by one or more hardware processors, a first data execution instruction for a first tenant;

determining that a first tenant metadata set associated with the first tenant is not in a first level memory of a memory hierarchy that comprises the first level memory and a second level memory, wherein the first level memory is a cache and the second level memory is a main memory;

generate a first tenant copy of the global metadata set by copying the global metadata set from a first position in the cache to a second, different position in the cache;

modifying the first tenant copy of the global metadata set in the first level memory using a first tenant differential metadata set to generate the first tenant metadata set; and executing the first data execution instruction for the first tenant on a first tenant data object using at least a portion of the first tenant metadata set.

14. The method of claim 13, further comprising:

receiving a second data execution instruction for a second tenant;

determining that a second tenant metadata set associated with the second tenant is not in the first level memory;

copying the global metadata set into the first level memory to generate a second tenant copy of the global metadata set;

modifying the second tenant copy of the global metadata set in the first level memory using a second tenant differential metadata set to generate the second tenant metadata set; and executing the second data execution instruction for the second tenant on a second tenant data object using at least a portion of the second tenant metadata set.

15. The method of claim 13, wherein the global metadata set comprises metadata for the entity and the metadata for the entity comprises a value for the attribute of the entity.

16. The method of claim 13, wherein:

the first tenant metadata set comprises metadata for the entity;

the metadata for the entity comprises a value for the attribute of the entity; and the portion of the first tenant metadata set used to execute the first data execution instruction includes the value of the attribute of the entity.

17. The method of claim 13, wherein the modifying of the first tenant copy of the global metadata set in the first level memory using the first tenant differential metadata set to generate the first tenant metadata set comprises removing, from the first tenant copy, properties that are indicated as being removed in the first tenant differential metadata set.

18. The method of claim 13, wherein the modifying of the first tenant copy of the global metadata set in the first level memory using the first tenant differential metadata set to generate the first tenant metadata set comprises removing, from the first tenant copy, the attribute of a property that is indicated as being removed in the first tenant differential metadata set.

19. The method of claim 13, wherein the modifying of the first tenant copy of the global metadata set in the first level memory using the first tenant differential metadata set to generate the first tenant metadata set comprises overwriting attribute values in the first tenant copy with attribute values in the first tenant differential metadata set.

20. The method of claim 13, wherein the modifying of the first tenant copy of the global metadata set in the first level memory using the first tenant differential metadata set to generate the first tenant metadata set comprises adding, to the first tenant copy, the attribute of the property that is indicated as being added in the first tenant differential metadata set.

* * * * *